United States Patent [19]

Arjomand

[11] Patent Number: 4,604,812
[45] Date of Patent: Aug. 12, 1986

[54] PITCH-ANGLE-CHECKER (P-A-C)

[76] Inventor: Jahanbakhsh Arjomand, P.O. Box 4372, San Juan, P.R. 00905

[21] Appl. No.: 707,409

[22] Filed: Mar. 1, 1985

[51] Int. Cl.⁴ .......................... G01B 5/24; G01C 9/28
[52] U.S. Cl. ........................................ 33/387; 33/388; 33/530
[58] Field of Search ................. 33/1 N, 343, 384, 387, 33/388, 389, 530, 534

[56] References Cited

U.S. PATENT DOCUMENTS

| | | | |
|---|---|---|---|
| 1,641,243 | 9/1927 | Wochner | 33/388 |
| 2,295,184 | 9/1942 | Sandbo | 33/384 |
| 2,423,317 | 7/1947 | Holton | 33/388 |
| 2,961,771 | 11/1960 | Fronek | 33/388 |

FOREIGN PATENT DOCUMENTS

| | | | |
|---|---|---|---|
| 917873 | 9/1954 | Fed. Rep. of Germany | 33/387 |
| 319805 | 8/1902 | France | 33/388 |

*Primary Examiner*—Richard R. Stearns
*Attorney, Agent, or Firm*—Roylance, Abrams, Berdo & Goodman

[57] ABSTRACT

A pitch and angle measuring instrument including three basic elements; a base, a main dial and an elongated pointer. The base includes a bottom portion which is designed to rest on a pipe or other item for which the angle or pitch is desired to be measured. An upper portion extends upward from the lower portion and has a first calibrated scale thereon. The main dial member is rotatedly affixed to the base and extends upward therefrom. A second calibrated scale is located on the main dial member. The elongated pointer is also rotatively connected to the base about the same pivot point as the main dial member. The pointer includes a level indicator. The first and second calibrated scales are arcuate having the same center point. However, the radius of the arc formed by the second scale is greater than the radius of the arc formed by the first scale. The pointer includes means to indicate a reading on both of the scales when the level indicator is at a level position. The second calibrated scale has graduations of smaller units than the first calibrated scale. The second calibrated scale is employed to measure angles which fall between the graduations of the first calibrated scale.

15 Claims, 13 Drawing Figures

THE RATIOS BETWEEN THE PHYSICAL SIZES OF A LARGE AND A SMALL "PITCH-ANGLE-CHECKER" AND AN EQUIVALENT ROUND DIAL ANGLE MEASURING INSTRUMENT 4,604,812

PITCH-ANGLE-CHECKER (P-A-C)

FIELD OF INVENTION

This invention relates to a simple mechanical tool specially designed for introducing, measuring and checking low pitches and related angles.

DESCRIPTION OF PRIOR ART

Although various kinds of instruments are known for introducing and measuring angles and pitches at "on site" working locations, the precision instruments which can measure fractions of a degree accurately (such as transits) are expensive and skilled persons are needed to operate them. On the other hand, the inexpensive measuring instruments which are on the market for the same purpose are not suitable for measuring low or small pitches or fractions of a degree.

In the "UNIVERSAL PROTRACTOR", for example, made by Craftsman, which is an angle measurer with a 3.25 inches calibrated round dial and a free-hanging pointer, each degree takes 0.028 of an inch on the dial. This is not even sufficient for distinguishing one whole degree, let along a fraction of a degree. Another disadvantage of these relatively inexpensive tools is the necessity for using conversion tables for converting angles into pitches. Therefore, what has been invented by me is a relatively inexpensive measuring tool which overcomes the disadvantages associated with the inexpensive prior art instruments.

SUMMARY OF THE INVENTION

This invention relates to a simple mechanical tool for introducing, measuring and checking low pitches within the range of zero to a low percentage accurately. It is also suitable for measuring up to a several 10-degree angle to the accuracy of minutes, without using a vernier or magnifier.

In addition, there is no need for using conversion tables in the range of low pitches because the dial is calibrated directly in percentage or in inches per foot and/or angles in degrees and minutes.

It replaces, in many cases, transits, levels and various other angle measuring tools.

Therefore, the main object of this invention is to introduce a new mechanical, handy, easy-to-use, easy-to-read, sufficiently accurate, inexpensive, trustful and light tool to industry for carrying out work that needs careful, exact and nonzigzagged pitches in critical sloped surfaces and lines, such as constructing piping networks having nonthreaded couplings.

Another object of this invention is to provide an instrument for helping workers perform their work with minimum error in the minimum time, as far as measuring pitch is concerned.

Yet a further object of this invention is to provide a useful tool for inspectors to check work involving pitches easily and quickly.

Hence, the preferred embodiments of this invention are being shown in the drawings and descriptions by way of example only.

DESCRIPTION OF THE INVENTION

Figure 1:
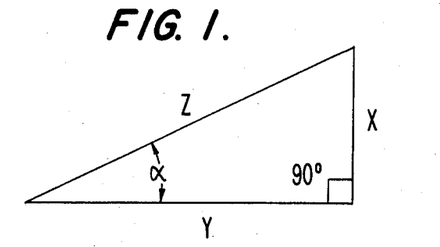
FIG. 1 illustrates the definition of pitch.

Referring to the drawings in detail, wherein the similar and like parts are identified by like reference numerals, FIG. 1 illustrates the relationship between pitch and angle in a right triangle. My invention, which is an angle measuring tool, is comprised of three main parts, main dial 1, base 3 and pointer 8, as described below.

Main dial 1 includes a calibrated scale that is a few-degree sector of a comparatively large circle. In the embodiment illustrated in FIGS. 2-5, a ten-degree sector of a circle having 57.3 centimeter diameter is selected as an example only for describing the invention. The scale has a range of ten-degrees; five degrees on each side of zero, see FIGS. 2, 3 and 4.

Figure 11:
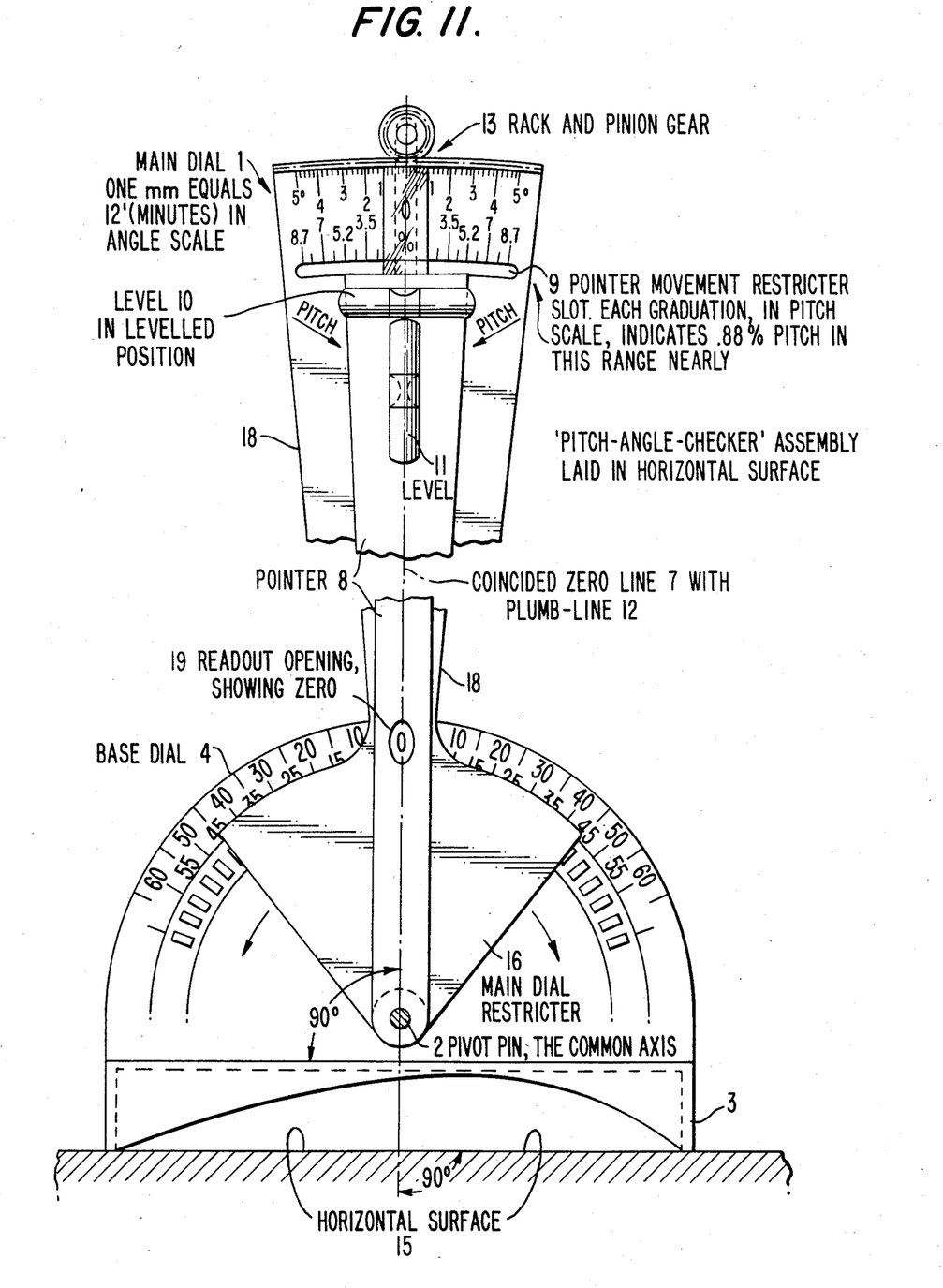
FIG. 11 is a front view of one embodiment of this invention placed on a level service, showing zero pitch.

Each degree takes ½ of a centimeter on the circumference of the main dial and is divided in 5 equal parts, one millimeter each (see FIG. 11).

Figures 2, 3, 4:
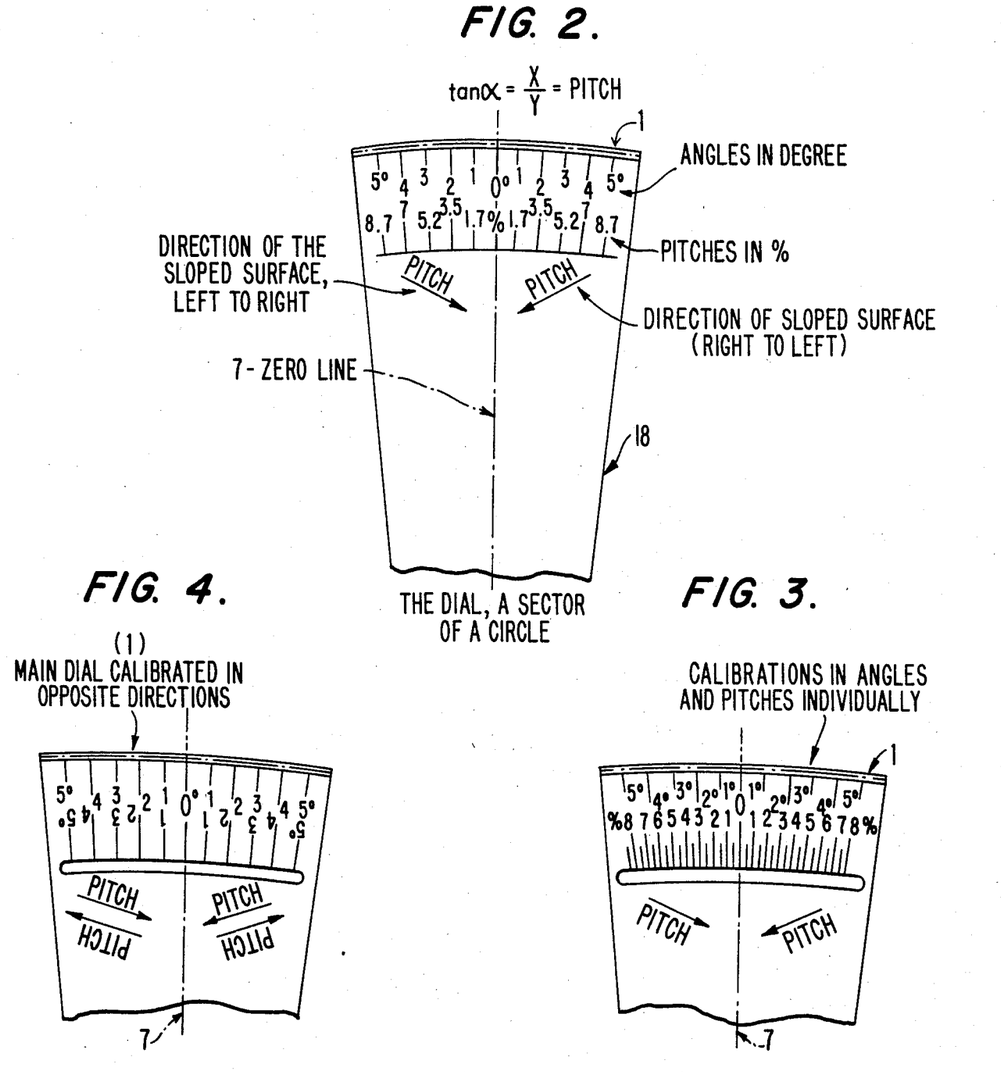
FIG. 2 is a partial front view of a main dial of one embodiment of this invention, the main dial being graduated in degrees and corresponding pitches in percentage.
FIG. 3 is a partial front view of a second main dial having two independent graduations in degree and pitch percentage.
FIG. 4 is a partial front view of another main dial having graduations in opposite directions for facilitating the readout while using the tool in the inverted position.
Figure 5:
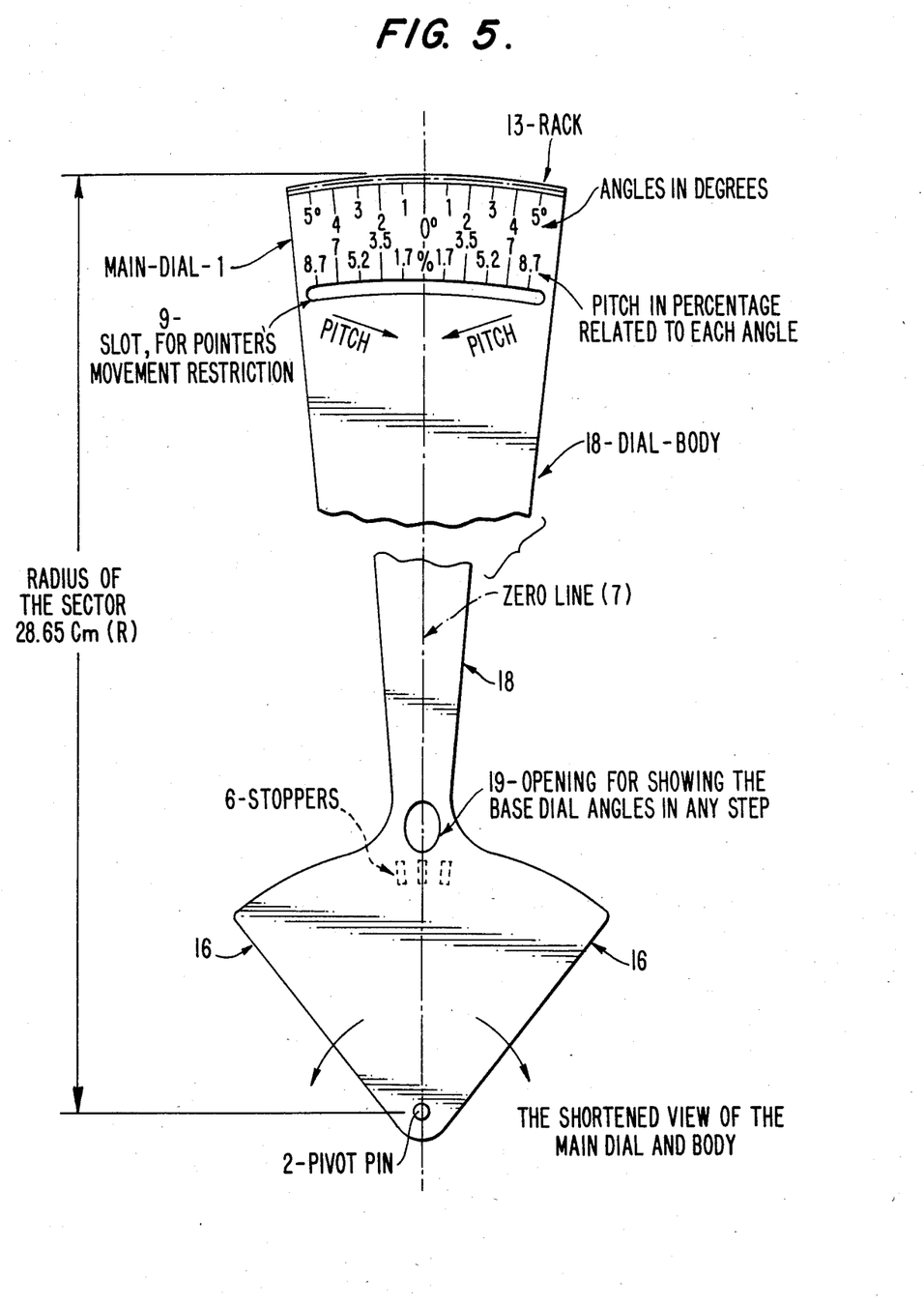
FIG. 5 is a front view of the main dial illustrated in FIG. 1.

In order to facilitate the readout of pitches on the main dial and to avoid having to refer to a conversion table, the main dial is also graduated directly in pitch (in metric system and/or in english system) and the corresponding angles (see FIGS. 2 and 3).

FIG. 4 shows the main dial 1 calibrated in degrees in opposite directions for using the instrument either normally or in the inverted position. FIG. 3 shows the main dial having both pitch and angle graduations up to 8 percent.

As can be seen in FIGS. 2, 3 and 4, the main dial can be calibrated as required for particular jobs. The main dial makes possible accurate measurements of pitch because ½ of a millimeter corresponds to six minutes (in this embodiment), which is easily distinguishable without employing a magnifier or vernier.

The main dial 1 is pivotable about the pivot pin 2 situated on the base 3 (see discussion below). The range of movement of main dial 1 about pivot pin 2 is limited by the restrictor 16, which is a part of the main-dial body 18 (see FIG. 5).

Figure 6:
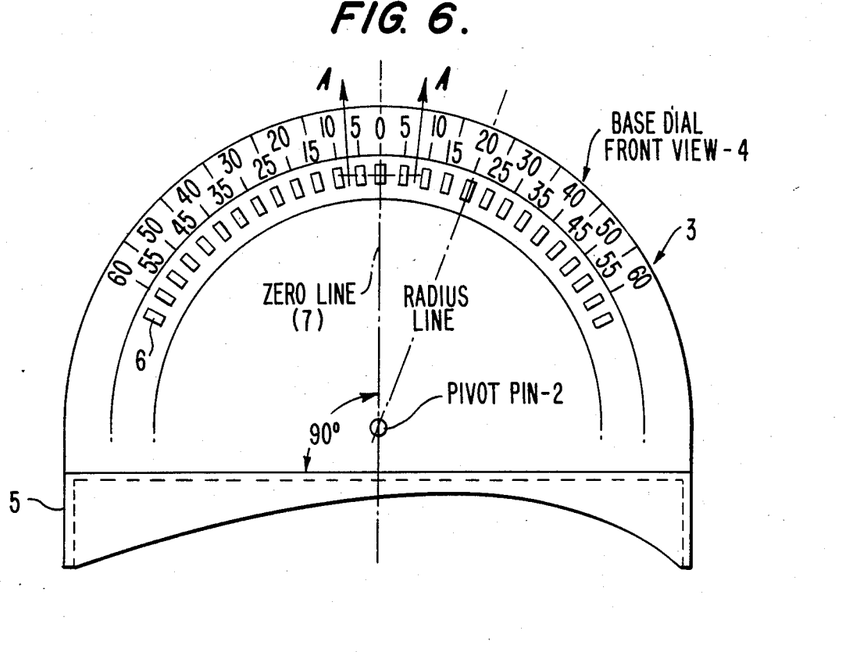
FIG. 6 is a front view of one embodiment of a base dial which can be employed in the practice of this invention.
Figure 7:
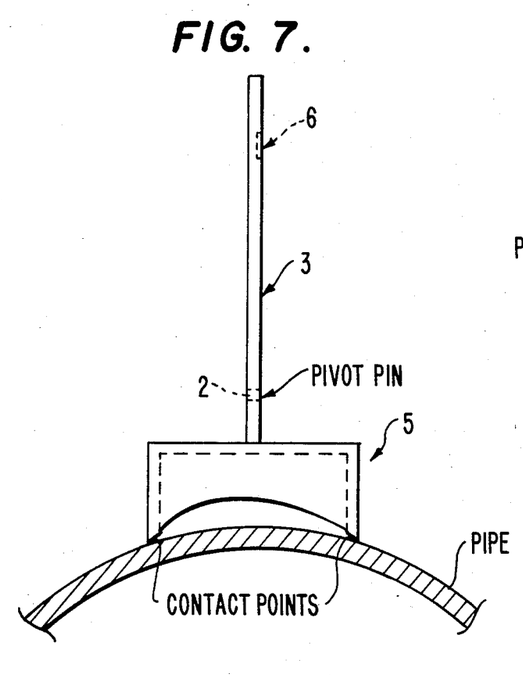
FIG. 7 is a side view of the base dial illustrated in FIG. 6, placed on a pipe.
Figure 8:
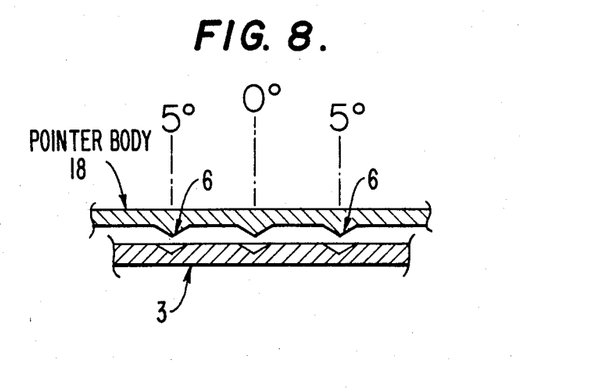
FIG. 8 is a partial cross sectional view of the main dial and base dial in the vicinity of the projections and slots which lock the main dial and the base dial together.

Base 3, for holding the main dial, is equipped with another dial, base dial 4, which is a larger sector (wider angle) of a smaller circle (compared to the main dial). Both scales of main dial 1 and base dial 4 have a common center. The base dial 4 is graduated in five-degree increments (equal to the greatest angle of the main dial 1) on both sides of zero for extending the measurement range of the instrument up to several ten-degrees in any direction when necessary (see FIGS. 6 and 7). The pivot pin 2, fixed on the center of the base dial 4, holds the main dial 1 freely; but stoppers 6 firmly stop the main dial's movement in any 5-degree steps of the base dial for keeping the accuracy of the instrument in all steps (See FIGS. 6 and 8). Stoppers 6 are either indents or slots in the face of base 3, spaced at 5-degree increments.

Figure 9:
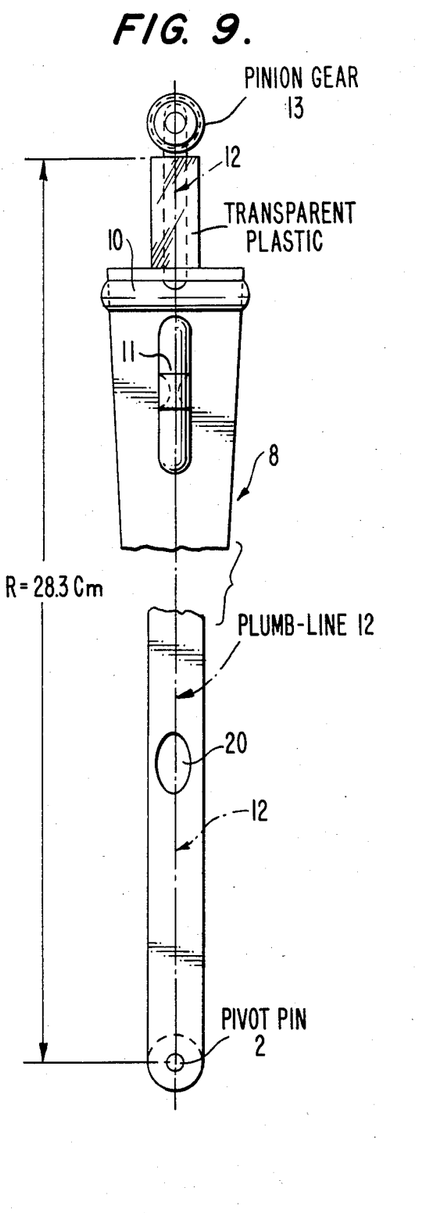
FIG. 9 is a front view of one embodiment of a pointer, including levels, which can be employed in the practice of this invention.
Figure 10:
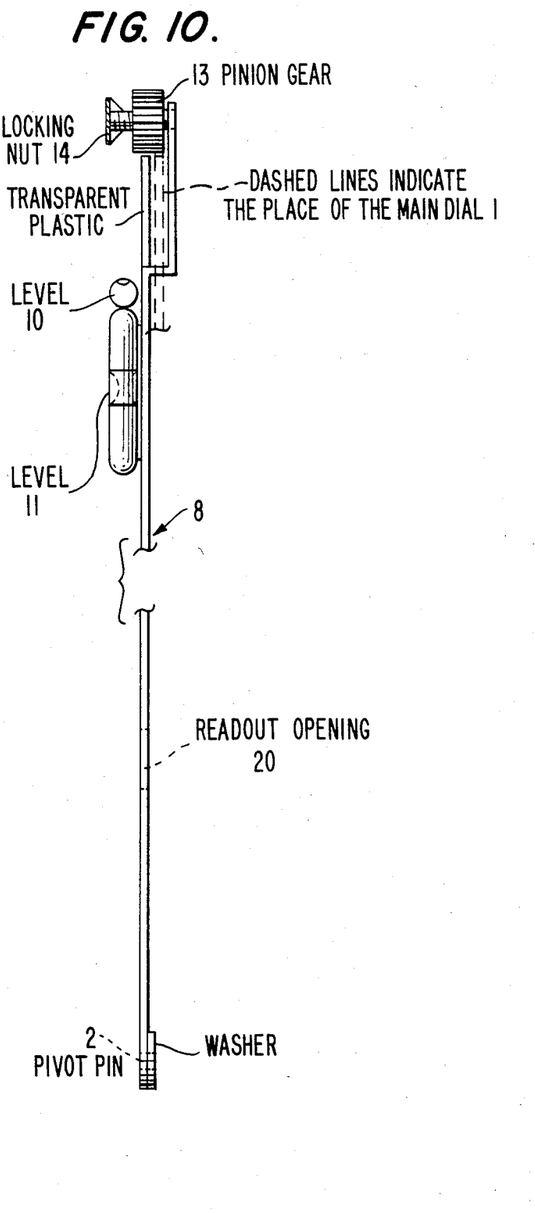
FIG. 10 is a side view of the pointer illustrated in FIG. 9.

The pointer 8, equipped with two small bubble levels 10 and 11, moves around the pivot pin 2 showing the desired pitches and angles on the main dial 1. The levels 10 and 11 are perpendicular to each other and level 10 is perpendicular to the plumb-line 12. The movement of the pointer 8 is limited to ten degrees relative to the main dial 1 by slot 9. The rack and pinion gear 13, installed on the main dial 1 and pointer 8, provides smooth and manual movement of the pointer 8 with respect to the main dial 1 for levelling one of the levels (10 or 11) see FIGS. 9, 10 and 11. A locking knob 14 (see FIG. 10), situated on the axis of gear 13 locks the pointer 8 to main-dial 1 avoiding misreading while moving the instrument.

Figure 12:
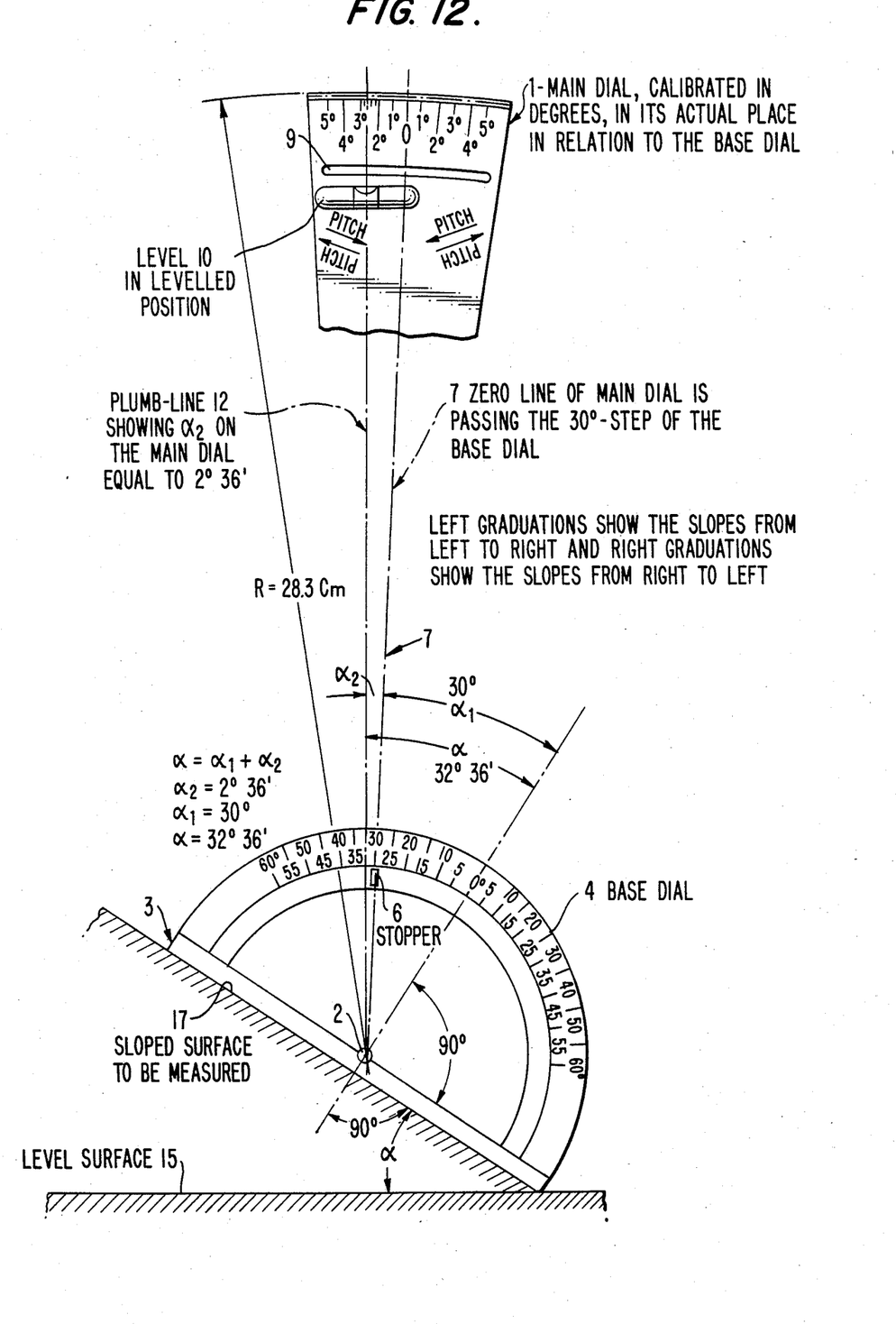
FIG. 12 is a schematic diagram of the embodiment of this invention illustrated in FIG. 11, placed on a slope having the angle α.

Now, if the three main parts 8, 1 and 3 are assembled in the stated order and put on level surface 15, as shown in FIG. 11, the plumb-line 12 of the pointer 8 will coincide with zero-line 7 of the main dial 1, both being perpendicular to level surface 15. In this position, pointer 8 shows ZERO on both dials, while level 10 is in the level position. If the level surface 15 changes its position as much as angle $\alpha$ (see FIG. 12) on the left or right, pointer 8 should be moved to the left or right to level the level 10 again. In this new position, pointer 8 shows an angle which is just equal to the angle $\alpha$. If angle $\alpha$ is less than 5 degrees, the angle or pitch can be read directly on the main dial. But if the angle $\alpha$ is more than 5 degrees, a suitable step angle of the base-dial has to be applied and added to the main dial. FIG. 12 shows the example wherein $\alpha$ is 32 degrees and 36 minutes. The main dial 1 has been shifted to the 30-degree step (seen through readout openings 19 and 20 in main dial 1 and pointer 8, respectively) and the pointer 8 shows angle $\alpha_2$ on the main-dial equal to 2 degrees and 36 minutes, therefore $\alpha = \alpha_1 + \alpha_2$ or $30° + 2° \, 36' = 32° \, 36'$.

As can be seen in FIG. 12, the instrument can measure any angle between zero and the sum of the main dial graduations and the highest step in base-dial in any of four positions (two positions horizontally and two positions vertically). In the embodiment shown in FIG. 12, the range of measurement is up to 65 degrees in either direction from zero. Using a non-suitable step (when main dial is not in engagement with a step of base dial 4) results in the inability of levels 10 or 11. Hence, the possibility of error is zero. Other embodiments of this invention can be manufactured, alternately, simpler and less expensive by omitting a half part of the main and base-dial from zero line 7. Such tool will act as a unidirectional tool (not shown).

Figure 13:
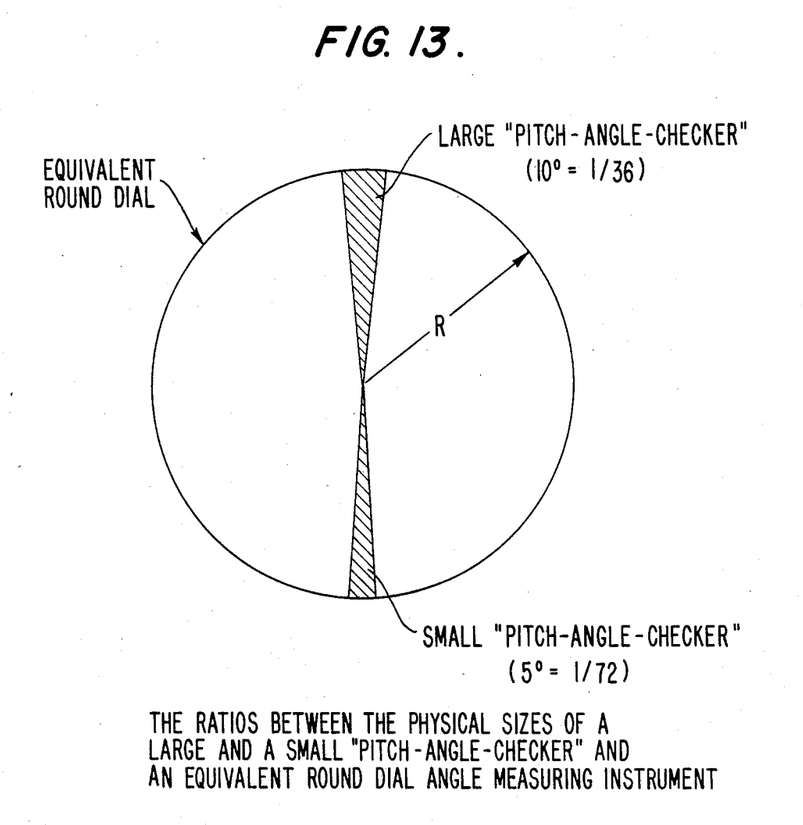
FIG. 13 is a schematic diagram comparing two sizes of checkers according to this invention with round dial instrument.

Another alternative is a bidirectional main dial (as mentioned in item 1) fixed to the base without base dial 4, its measurement range being the same as the main dial range. A further alternative is a unidirectional main dial fixed to a simple base without base dial. Any unidirectional tool can be used in any direction by reversing the instrument. The pitch angle checkers according to this invention replace an equivalent round-dial instrument having a 57.3-centimeter diameter, while it reduces the physical size as much as 1/72 to 1/36, as shown in FIG. 13.

What I claim is:

1. A pitch and angle measuring instrument comprising:
    a base including means for resting said base on an item and an upper portion extending upward from said means, said upper portion having a first calibrated scale thereon;
    a main dial member rotatably affixed to said base and extending upward therefrom, said main dial member having a second calibrated scale thereon; and
    an elongated pointer rotatably connected to said base about the same pivot point as said main dial member, said pointer including a level indicator;
    wherein said first and said second calibrated scales are arcuate having the same center point, the radius of the arc of the second scale being greater than the radius of the arc of the first scale, said second calibrated scale being of less arcuate length then said first calibrated scale, said second scale being graduated in smaller units than said first scale;
    said pointer including means for indicating a number on both of said scales when the level indicator is at a level position.

2. A pitch and angle measuring instrument according to claim 1 wherein
    said main dial member and said pointer are located in front of said base, said main dial member and said pointer having means for reading said first scale on said base.

3. A pitch and angle measuring instrument according to claim 1 wherein
    said base and said main dial member having interlocking means to set said main dial member in a variety of positions relative said base.

4. A pitch and angle measuring instrument according to claim 3 wherein
    said interlocking means is a series of equally spaced slots in one of said base and said main dial member and a mating projection on the other of said base and said main dial member.

5. A pitch and angle measuring instrument according to claim 4 wherein
    said slots are in the front of said base and said projection projects from the back surface of said main dial member.

6. A pitch and angle measuring instrument according to claim 1 further comprising
    a rack and pinion assembly connecting said pointer to said main dial member.

7. A pitch and angle measuring instrument according to claim 6 wherein
    said rack is located at the top of said main dial member and attached thereto,
    said pinion being attached to said pointer.

8. A pitch and angle measuring instrument according to claim 1 wherein said main dial member includes a lower portion and an upper portion, said upper portion comprising a sector of a circle and having said first scale thereon.

9. A pitch and angle measuring instrument according to claim 8 wherein
said upper portion has a slot extending therethrough, said slot forming an arc of a circle having the pivot point for said main dial member as the center;
said pointer including means engageable with the slot to limit the range of movement of the pointer relative to said main dial member.

10. A pitch and angle measuring instrument according to claim 9 wherein
said pointer includes a front portion located in front of said main dial member and a back portion located in back of said main dial member;
said engaging means including an arm which connects said front and back portions.

11. A pitch and angle measuring instrument according to claim 10 wherein
said front portion is transparent.

12. A pitch and angle measuring instrument according to claim 1 further comprising
a locking assembly attached to said pointer for fixing the position of said pointer relative to said main dial member.

13. A pitch and angle measuring instrument according to claim 12 wherein
said level indicator includes two bubble levels oriented perpendicular to each other.

14. A pitch and angle measuring instrument according to claim 1 wherein
said second scale is empolyed to more precisely measure angles which fall between the graduations of said first scale.

15. A pitch and angle measuring instrument comprising
a base including means for resting on an item and an upper portion extending upward therefrom said upper portion being a flat plate comprising a sector of a circle, said upper portion having a first calibrated scale thereon;
a main dial rotatably attached to said base, said main dial including an elongated arm and an upper portion, said main dial being a flat plate having a lower elongated arm and an upper portion, said upper portion comprising a sector of a circle and having a second calibrated scale thereon; and
a pointer rotatably attached to said base and having the same pivot point as said main dial, said pointer including means for indicating numbers on said first and second scales and a level indicator;
said base and said main dial including means for locking said main dial in a plurality of equally spaced positions relative to said base;
said first and said second scales being arcuate with a common center, the radius of the arc formed by the second scale being greater than the radius of the arc formed by said first scale,
wherein said second scale is employed to measure angles which fall between the graduations of said first scale.

* * * * *